United States Patent
Schultz et al.

(10) Patent No.: US 7,528,893 B2
(45) Date of Patent: May 5, 2009

(54) BACKLIGHT FOR LIQUID CRYSTAL DISPLAY

(75) Inventors: John C. Schultz, Afton, MN (US);
Robert L. Brott, Woodbury, MN (US);
Michael J. Sykora, Deer Park, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 166 days.

(21) Appl. No.: 11/750,412

(22) Filed: May 18, 2007

(65) Prior Publication Data

US 2008/0284945 A1    Nov. 20, 2008

(51) Int. Cl.
*G02F 1/1335* (2006.01)
(52) U.S. Cl. ........................................ 349/12
(58) Field of Classification Search ........ 349/15
See application file for complete search history.

(56) References Cited

U.S. PATENT DOCUMENTS

| | | | |
|---|---|---|---|
| 6,128,059 A * | 10/2000 | Nishiguchi | 349/129 |
| 2005/0052750 A1 | 3/2005 | King | |
| 2005/0276071 A1 | 12/2005 | Sasagawa | |
| 2006/0013273 A1 | 1/2006 | Menon | |
| 2006/0132673 A1 | 6/2006 | Ito | |
| 2007/0008406 A1 | 1/2007 | Shestak et al. | |

FOREIGN PATENT DOCUMENTS

| | | |
|---|---|---|
| JP | 2001/273910 | 10/2001 |
| KR | 10-2000-0001751 | 1/2000 |
| KR | 10-2007-0023210 | 2/2007 |

OTHER PUBLICATIONS

"Dual Direction Backlight for Stereoscopic LCD", Sasagawa, T., et al., p. 1-3, Society for Information Display, 2003 (Digest) (SID03).

* cited by examiner

*Primary Examiner*—David Nelms
*Assistant Examiner*—Phu Vu
(74) *Attorney, Agent, or Firm*—Lance L. Vietzke

(57) ABSTRACT

A backlight includes a lightguide having a light emission surface, a first light input surface, a second light input surface opposing the first light input surface, and a lightguide thickness. A plurality of antireflection features are on or in the first light input surface and second light input surface. Each antireflection feature has a base length value and a height value that are less than the light guide thickness. A right eye image solid state light source is positioned to provide light into the first light input surface and a left eye image solid state light source is positioned to provide light into the second light input surface.

22 Claims, 2 Drawing Sheets

BACKLIGHT FOR LIQUID CRYSTAL DISPLAY

FIELD

The present disclosure relates to a backlit liquid crystal display and particularly to a backlight for a liquid crystal display that reduces visual cross-talk between displayed left eye and right eye images.

BACKGROUND

A stereoscopic display usually presents an observer with images with parallax from individual right and left eye viewpoints. There are two methods of providing the two eyes of the observer with the parallax images. In one method, the observer utilizes a pair of shutter or 3D glasses which transmit or block light from the viewer's eyes in synchronization with alternating the left/right image display. Similarly, in another method, right eye and left eye viewpoints are alternatively displayed and led to the respective eyes of the observer but without the use of 3D glasses. This second method is referred to as autostereoscopic and is desired for stereo 3D viewing because separate glasses are not needed.

A liquid crystal display (LCD) is a sample and hold display device such that the image at any point or pixel of the display is stable until that pixel is updated at the next image refresh time, typically 1/60 of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

Ensuring that the right and left light sources are on or off in synchronization with the image display is important to achieve a high quality autostereoscopic image. Further, if the left and right sources provide alternating illumination of a directional backlight structure which extracts light based on the light source end when the right eye image light input surface opposes a left eye image light input surface, light entering either surface can subsequently reflect off the opposing surface and create visual confusion between the left eye image and right eye image or equivalently cross-talk between left eye and right eye images resulting in poor 3D image quality.

BRIEF SUMMARY

The present disclosure relates to a backlit liquid crystal display apparatus and particularly to an backlight for a liquid crystal display that reduces visual cross-talk between displayed left eye and right eye images.

In a first embodiment, a backlight includes a lightguide having a light emission surface, a first light input surface, a second light input surface opposing the first light input surface, and a lightguide thickness. A plurality of antireflection features are on or in the first light input surface and second light input surface. Each antireflection feature has a base length value and a height value that are less than the light guide thickness. A right eye image solid state light source is positioned to provide light into the first light input surface and a left eye image solid state light source is positioned to provide light into the second light input surface.

In another embodiment, a backlight includes a lightguide having a light emission surface, a first light input surface, a second light input surface opposing the first light input surface, and a lightguide thickness. A plurality of antireflection features are on or in the first light input surface and second light input surface. Each antireflection feature has at least two surfaces including an antireflection layer or light absorption layer. A right eye image solid state light source is positioned to provide light into the first light input surface and a left eye image solid state light source is positioned to provide light into the second light input surface.

In a further embodiment, a display apparatus includes a liquid crystal display panel and a backlight positioned to provide light to the liquid crystal display panel. The backlight includes a lightguide having a light emission surface, a first light input surface, a second light input surface opposing the first light input surface, and a lightguide thickness. A plurality of antireflection features are on or in the first light input surface and second light input surface. Each antireflection feature has a base length value and a height value that are less than the light guide thickness. A right eye image solid state light source is positioned to provide light into the first light input surface, and a left eye image solid state light source is positioned to provide light into the second light input surface.

In another embodiment, a display apparatus includes a liquid crystal display panel and a backlight positioned to provide light to the liquid crystal display panel. The backlight includes a lightguide having a light emission surface, a first light input surface, a second light input surface opposing the first light input surface, and a lightguide thickness. A plurality of antireflection features are on or in the first light input surface and second light input surface. Each antireflection feature has a base length value and a height value that are less than the light guide thickness. A right eye image solid state light source is positioned to provide light into the first light input surface, and a left eye image solid state light source is positioned to provide light into the second light input surface.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
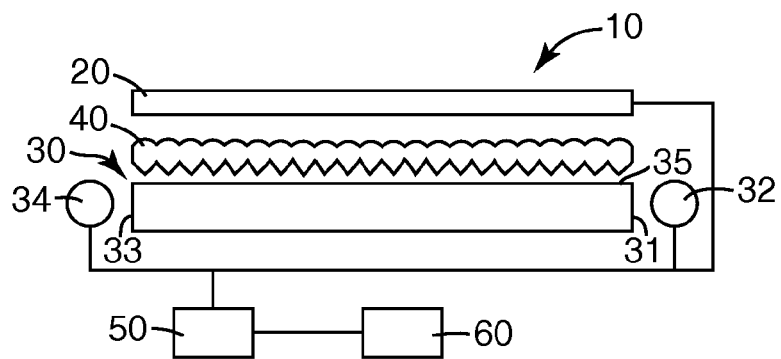
FIG. 1 is a schematic side view of an illustrative display apparatus.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "autostereoscopic" refers to displaying three-dimensional images that can be viewed without the use of special headgear or glasses on the part of the user or viewer. These methods produce depth perception in the viewer even though the image is produced by a flat device.

The present disclosure relates to a backlit liquid crystal display apparatus and particularly to an autostereoscopic backlight for a liquid crystal display that reduces visual crosstalk between displayed left eye and right eye images. Backlights described herein include a plurality of antireflection features on opposing light input surface that force reflected light to undergo multiple bounces before possibly returning toward its light input surface. These features include a light absorbing material and/or an antireflection material. These features can be integral with the backlight or applied as a film, post-fabrication molded features or deposited features such as by an ink-jet process to each light input surface of the backlight. The features can be regular or irregular and have an aspect ratio of greater than one. While the present invention is not so limited, an appreciation of various aspects of the invention will be gained through the discussion provided below.

A liquid crystal display is a sample and hold display device such that the image at any particular point is stable until that point or pixel is updated at the next image refresh time, typically within 1/60 of a second or faster. In such a sample and hold system, displaying different images, specifically alternating left and right images for an autostereoscopic display, during sequential refresh periods of the display requires careful sequencing of the backlight light sources so that, for example, the left eye light source is not on during the display of data for the right eye and vice versa. Further the left and right eye image light sources should not be reflected or otherwise be made to appear to come from the opposing eye image light source. Methods of providing a useful backlight for such a display are to use two transparent plates with a roughened area as described in U.S. Patent Application No. 2006/013273, or a single lightguide with right and left light sources at either end and a single antireflection surface, also described in U.S. Patent Application No. 2006/013273, which is incorporated by reference herein.

FIG. 1 is a schematic side view of an illustrative display apparatus 10. The display apparatus includes a liquid crystal display panel 20 having a frame response time of less than 10 milliseconds, or less than 5 milliseconds, and a backlight 30 positioned to provide light to the liquid crystal display panel 20. The backlight 30 includes a right eye image solid state light source 32 and a left eye image solid state light source 34 capable of being modulated between the right eye image solid state light source 32 and the left eye image solid state light source 34 at a rate of at least 90 Hertz. A double sided prism film 40 is disposed between the liquid crystal display panel 20 and the backlight 30.

The liquid crystal display panel 20 and/or backlight 30 can have any useful shape or configuration. In many embodiments, the liquid crystal display panel 20 and backlight 30 has a square or rectangular shape. However, in some embodiments, the liquid crystal display panel 20 and/or backlight 30 has more than four sides or is a curved shape. While the present disclosure is directed to any backlight and associated liquid crystal display panel, the present disclosure is particularly useful for autosteroscopic displays.

A synchronization driving element 50 is electrically connected to the backlight 30 light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of 90 frames per second or greater to the liquid crystal display panel 20 to produce a flicker-free video or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any transmissive liquid crystal display panel that has a frame response time of less than 10 milliseconds, or less than 5 milliseconds. Commercially available transmissive liquid crystal display panels having a frame response time of less than 10 milliseconds, or less than 5 milliseconds include HannStar's HSD190ME13 (HannStar Display Corporation, Taiwan) and Toshiba Matsushita Display's (TMD) optically compensated bend (OCB) mode panel LTA090A220F (Toshiba Matsushita Display Technology Co., Ltd., Japan).

The backlight 30 can be any useful backlight that can be modulated between a right eye image solid state light source 32 and left eye image solid state light source 34 at a rate of at least 90 Hertz, or 100 Hertz, or 110 Hertz, or 120 Hertz, or greater than 120 Hertz. The illustrated backlight 30 includes a first light input surface 31 adjacent to the right eye image solid state light source 32 and an opposing second light input surface 33 adjacent to the left eye image solid state light source 34 and a light output surface 35. The solid state light sources can be any useful solid state light source that can be modulated at a rate of at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as white, red, blue, and/or green. The backlight can be a single layer of optically clear material with a light sources at both opposing ends or two (or more) layers of optically clear material with a light source per layer which preferentially extract light in a desired direction for each layer.

The double sided prism film 40 can be any useful prism film having a lenticular structure on a first side and a prismatic structure on an opposing side. The double sided prism film 40 transmits light from the backlight to the liquid crystal display panel 20 at the proper angles such that a viewer perceives depth in the displayed image. Useful, double sided prism films are described in United States Patent Publication Nos. 2005/0052750 and 2005/0276071, which are incorporated herein to the extent they do not conflict with the present disclosure.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of 90 frames per second or greater to the autosteroscopic liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
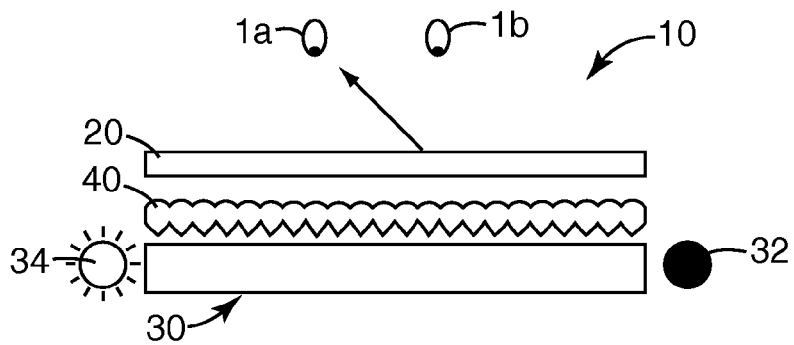
FIG. 2A and FIG. 2B are schematic side views of an illustrative autostereoscopic display apparatus in operation.
Figure 2B:
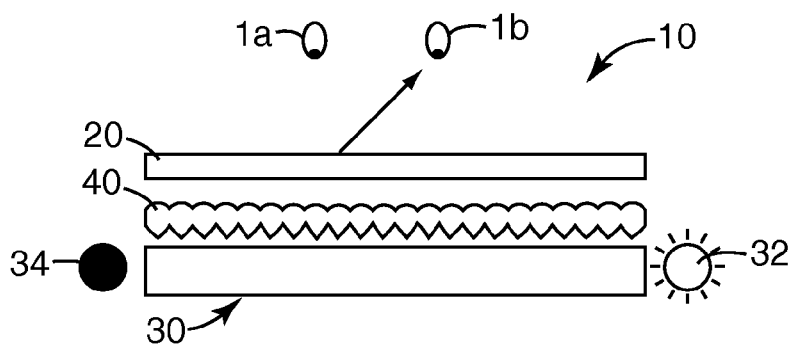

FIG. 2A and FIG. 2B are schematic side views of an illustrative display apparatus 10 in operation. In FIG. 2A the left eye image solid state light source 34 is illuminated and the right eye image solid state light source 32 is not illuminated. In this state, the light emitted from the left eye image solid state light source 34 transmits through the backlight 30, through the double sided prism sheet 40, and liquid crystal panel 20 providing a left eye image directed toward the left eye 1a of an viewer or observer. In FIG. 2B the right eye image solid state light source 32 is illuminated and the left eye image solid state light source 34 is not illuminated. In this state, the light emitted from the right eye solid state light source 32 transmits through the backlight 30, through the double sided prism sheet 40, and liquid crystal panel 20 providing a right eye image directed toward the right eye 1b of an viewer or observer.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint images either computer rendered or acquired by appropriately positioned still image or video image cameras as described above, alternating in synchronization with the switching of the light sources 32 and 34 enables the viewer to visually fuse the two different images, creating the perception of depth from the flat panel display.

In many instances, these backlights have some light that is not extracted in a single pass and this light partially reflects off the opposing light input surface. This reflected light then appears as if it came from the opposite light source and produces some level of background light into the incorrect observer eye creating cross-talk between left and right eye images in the stereo image visualization and a degraded 3D viewing experience for an observer.

Backlights 30 described herein include a plurality of antireflection features (described below) on opposing light input surface 31, 33 that force reflected light to undergo multiple bounces before possibly returning toward its light input surface 31, 33. These features include a light absorbing material and/or an antireflection material (described below), which can be integral with the backlight or applied as a film to each light input surface of the backlight, and be regular or irregular and have an aspect ratio of greater than 0.5 or greater than one. These antireflection features aid in reducing visual cross-talk between left eye and right eye images displayed on an autostereoscopic display by reducing or eliminating the light not extracted in the first pass of the lightguide thereby, improving the stereo image visualization and 3D viewing experience for an observer.

Figure 3:
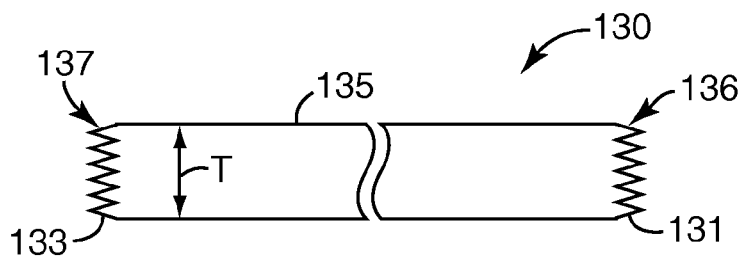
FIG. 3 is a schematic cross-sectional view of an illustrative autostereoscopic backlight.
Figure 4A:
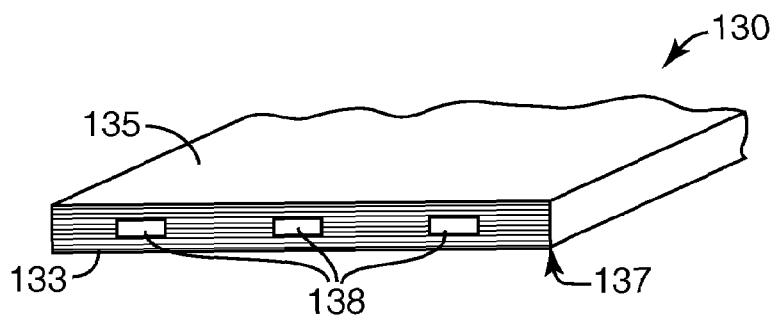
FIG. 4A and FIG. 4B are schematic perspective views of illustrative backlight light input surfaces.
Figure 4B:
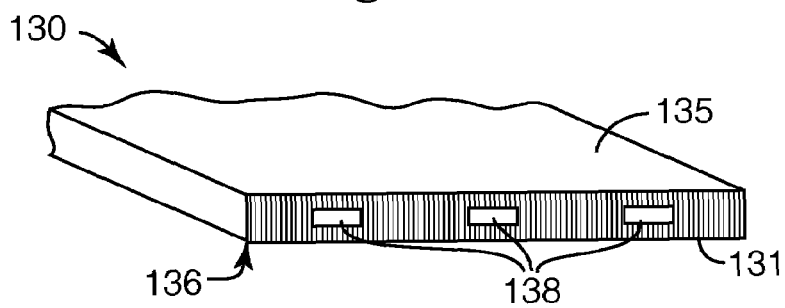
Figure 5:
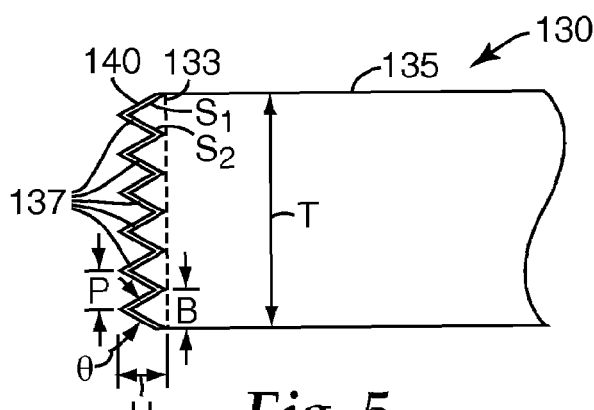
FIG. 5 is a schematic cross-sectional view of an illustrative backlight light input surface.
Figure 6:
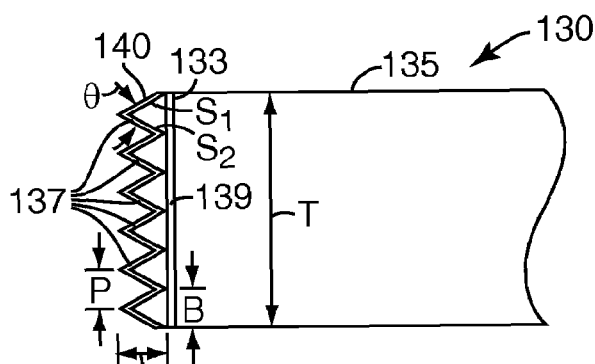
FIG. 6 is a schematic cross-sectional view of another illustrative backlight light input surface.

FIG. 3 is a schematic cross-sectional view of an illustrative backlight lightguide 130. FIG. 4A and FIG. 4B are schematic perspective views of illustrative backlight 130 light input surfaces 131, 133. FIG. 5 is a schematic cross-sectional view of an illustrative backlight 130 light input surface 131, 133. FIG. 6 is a schematic cross-sectional view of another illustrative backlight 130 light input surface 131, 133.

The lightguide 130 includes a light emission surface 135, a first light input surface 131, a second light input surface 133 opposing the first light input surface, and a lightguide thickness T value. A plurality of antireflection features 136, 137 are on or in the first light input surface 131 and second light input surface 133. In many embodiments, each antireflection feature 136, 137 has a base length B value and a height H value that are less than the light guide thickness T value (see FIG. 5 and FIG. 6). In some embodiments, each antireflection feature 136, 137 has at least two surfaces $S_1$, $S_2$ having an antireflection layer 140 or light absorption layer 140.

In some embodiments, the antireflection feature 136, 137 are microreplicated features that are integrally formed (e.g., molded) with the lightguide 130 (see FIG. 5). In some embodiments, the antireflection feature 136, 137 are microreplicated features in the form of a film that is applied onto the lightguide 130 (see FIG. 6). In some cases, the antireflection features 136, 137 may be deposited by, for example, single or multiple layer vacuum evaporation, single or multiple layer organic or inorganic coating, inkjet deposition, screen, gravure, or other printing process or roughened by mechanical, chemical or other methods for the purpose of index matching (for transmission out of the backlight). In many embodiments, the antireflection feature 136, 137 include a plurality of prismatic structures which force reflected light to undergo multiple bounces before returning into the lightguide 130. The plurality of prismatic structures (linearly extending as illustrated or discrete structures such as pyramidal or cube corners) can be regular or irregular. In some embodiments, other (non-prismatic structures) regular or irregular antireflection features are used such as, high aspect ratio cones or any structure for which light entering the structure must undergo more than one bounce before returning into the lightguide.

The antireflection feature 136, 137 can be formed of any light transmitting material and can be formed of the same or different material that forms the lightguide 130. In many embodiments, the antireflection feature 136, 137 have a substantially similar or the same refractive index as the lightguide 130 refractive index.

As shown in FIG. 4A, the plurality of prismatic antireflection features 137 can be linearly extending prismatic antireflection features 137 orientated horizontally or parallel with the light emission surface 135. While only the second light input surface 133 of the lightguide 130 is shown, it is understood that the same configuration applied to the first light input surface 131. In some of these embodiments, light input apertures 138 define holes or void spaces within the antireflection feature 137 structure or array. These apertures 138 allow light source 34 (see FIG. 1) light to enter the light input surface 133 of the lightguide 130.

In many embodiments, the antireflection features 137 surround two or more sides of each aperture 138.

As shown in FIG. 4B, the plurality of prismatic antireflection features 136 can be linearly extending prismatic antireflection features 136 orientated orthogonal or non-parallel with the light emission surface 135. While only the first light input surface 131 of the lightguide 130 is shown, it is understood that the same configuration applied to the second light input surface 133. In some of these embodiments, light input apertures 138 define holes or void spaces within the antireflection feature 136 structure or array. These apertures 138 allow light source 32 (see FIG. 1) light to enter the light input surface 131 of the lightguide 130. In many embodiments, the antireflection features 136 surround two or more sides of each aperture 138.

The antireflection feature 136, 137 include an antireflection layer 140 and/or a light absorption layer 140. Two or more antireflection feature 136, 137 surfaces $S_1$, $S_2$ include the antireflection layer 140 and/or a light absorption layer 140. These antireflection features 136, 137 cause most incident light to undergo multiple bounces before returning to the lightguide 130 body, multiplying the absorptance of the absorbing interface 140 and hence reducing the amount of light reflected back toward the opposing light input surface 131, 133.

When a light absorption layer 140 is employed, each antireflection feature 136 and 137 functions as a multi-bounce light sink, efficiently absorbing light transmitted from he opposing light input surface 133 and 131, respectively. The light absorption layer 140 can be any useful light absorbing material such as, for example, a pigment, dye and the like. In many embodiments, the light absorption layer 140 includes a light absorbing or colored pigment such as, for example, a black pigment.

When an antireflection layer 140 is employed, each antireflection feature 136 and 137 functions as a multi-bounce light sink, efficiently transmitting light out of the lightguide 130 that was transmitted from he opposing light input surface 133 and 131, respectively. The antireflection layer 140 can be any useful antireflection material or layers of materials such as, for example, silicon dioxide, alternating layers of varying refractive index polymers, and the like. In theses embodiments, a light absorbing material can then be placed adjacent to the antireflection feature 136 and 137 to absorb any transmitted light, as desired.

While the linear linearly extending prismatic antireflection features 136 are illustrated orthogonal (FIG. 4B) or parallel (FIG. 4A) with the light emission surface 135, it is understood that the linear linearly extending prismatic antireflection features 136 can be oriented at any angle (from 0 to 90 degrees) relative to the light emission surface 135 such as, for example, 30 degrees, 45 degrees. These linearly extending prismatic antireflective features 136 may not be continuous, as illustrated in FIG. 4A and FIG. 4B where apertures 138 are placed along selected linearly extending prismatic antireflective features 136.

FIG. 5 illustrates a lightguide 130 with antireflection features 137 integrally formed with the lightguide 130. FIG. 6 illustrates a lightguide 130 with antireflection features 137 applied as a film on the light input surface 133 of the lightguide 130. The antireflection feature 137 film can be adhered to the light input surface 133 of the lightguide 130 via any useful optical or light transmitting adhesive material, such as a pressure sensitive adhesive such as one available under the trade designation OP1 from 3M Company, St. Paul, Minn., or structural adhesive.

Each antireflection feature 136, 137 can have any useful shape for increasing the number or light bounces for incident light. In many embodiments, the plurality of antireflection features 136, 137 can have any regular or irregular configuration, such as pitch P, apex angle θ, and aspect ratio. For example, the plurality of antireflection features 136, 137 can have a regular pitch P, apex angle θ, and aspect ratio, or the plurality of antireflection features 136, 137 can have a varying pitch P, varying apex angle θ, and/or varying aspect ratio, as desired.

In some embodiments, at least selected antireflection features 136, 137 have an apex angle θ in a range from 85 to 95 degrees, or from 50 to 85 degrees, or from 25 to 50 degrees. In some embodiments, at least selected antireflection features 136, 137 have a pitch P in a range from 10 to 10000 micrometers, or from 50 to 1000 micrometers. In some embodiments, at least selected antireflection features 136, 137 have an aspect ratio (i.e., height H/base B) in a range from 0.5 to 10, or 0.5 or greater. In some embodiments, the antireflection feature 136, 137 can be provided as a commercially available film under the trade designation BRIGHTNESS ENHANCING FILM or BEF, BEF II, or BEF III from 3M Company, St. Paul, Minn.

Thus, embodiments of the BACKLIGHT FOR LIQUID CRYSTAL DISPLAY are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A backlight, comprising,
   a lightguide having a light emission surface, a first light input surface, a second light input surface opposing the first light input surface, and a lightguide thickness, a plurality of antireflection features are on or in the first light input surface and second light input surface, each antireflection feature has a base length value and a height value that are less than the light guide thickness; and
   a right eye image solid state light source positioned to provide light into the first light input surface, and a left eye image solid state light source positioned to provide light into the second light input surface.

2. A backlight according to claim 1, wherein at least selected antireflection features have at least two surfaces comprising an antireflection layer or light absorption layer.

3. A backlight according to claim 1, wherein at least selected antireflection features have at least two surfaces comprising a light absorption layer.

4. A backlight according to claim 1, wherein at least selected antireflection features have an aspect ratio of 0.5 or greater.

5. A backlight according to claim 1, wherein at least selected antireflection features form linear prism elements.

6. A backlight according to claim 5, wherein at least selected linear prism elements extend parallel to the light emission surface of the lightguide.

7. A backlight according to claim 5, wherein at least selected linear prism elements extend orthogonal to light emission surface of the lightguide.

8. A backlight, comprising,
- a lightguide having a light emission surface, a first light input surface, a second light input surface opposing the first light input surface, and a lightguide thickness, a plurality of antireflection features are on or in the first light input surface and second light input surface, each antireflection feature has at least two surfaces comprising an antireflection layer or light absorption layer; and
- a right eye image solid state light source positioned to provide light into the first light input surface, and a left eye image solid state light source positioned to provide light into the second light input surface.

9. A backlight according to claim 8, wherein at least selected antireflection features has a base length value and a height value that are less than the light guide thickness.

10. A backlight according to claim 8, wherein at least selected antireflection features have at least two surfaces comprising a light absorption layer.

11. A backlight according to claim 9, wherein at least selected antireflection features have an aspect ratio of 0.5 or greater.

12. A backlight according to claim 8, wherein at least selected antireflection features form linear prism elements.

13. A backlight according to claim 12, wherein at least selected linear prism elements extend parallel to light emission surface of the lightguide.

14. A backlight according to claim 12, wherein at least selected linear prism elements extend orthogonal to light emission surface of the lightguide.

15. A display apparatus, comprising;
- an autostereoscopic liquid crystal display panel; and
- a backlight positioned to provide light to the autostereoscopic liquid crystal display panel, the backlight comprising:
- a lightguide having a light emission surface, a first light input surface, a second light input surface opposing the first light input surface, and a lightguide thickness, a plurality of antireflection features are on or in the first light input surface and second light input surface, each antireflection feature has a base length value and a height value that are less than the light guide thickness; and
- a right eye image solid state light source positioned to provide light into the first light input surface, and a left eye image solid state light source positioned to provide light into the second light input surface.

16. A display apparatus according to claim 15, wherein at least selected antireflection features have at least two surfaces comprising an antireflection layer or light absorption layer.

17. A display apparatus according to claim 15, wherein at least selected antireflection features have an aspect ratio of 0.5 or greater.

18. A display apparatus according to claim 15, wherein at least selected antireflection features form linear prism elements.

19. A display apparatus according to claim 15, further comprising a synchronization driving element that synchronizes activation and deactivation of the right eye image solid state light source and the left eye image solid state light source with image frames displayed on the autostereoscopic liquid crystal display panel.

20. A display apparatus, comprising;
- an autostereoscopic liquid crystal display panel; and
- a backlight positioned to provide light to the autostereoscopic liquid crystal display panel, the backlight comprising:
- a lightguide having a light emission surface, a first light input surface, a second light input surface opposing the first light input surface, and a lightguide thickness, a plurality of antireflection features are on or in the first light input surface and second light input surface, each antireflection feature has at least two surfaces comprising an antireflection layer or light absorption layer; and
- a right eye image solid state light source positioned to provide light into the first light input surface, and a left eye image solid state light source positioned to provide light into the second light input surface.

21. A display apparatus according to claim 20, wherein at least selected antireflection features form linear prism elements.

22. A display apparatus according to claim 20, further comprising a synchronization driving element that synchronizes activation and deactivation of the right eye image solid state light source and the left eye image solid state light source with image frames displayed on the autostereoscopic liquid crystal display panel.

* * * * *